Patented Dec. 28, 1937

2,103,304

UNITED STATES PATENT OFFICE 2,103,304

CHEESE PRODUCT

George Lincoln Teller and W. Kedzie Teller, Chicago, Ill., assignors to Henry H. Doering, Chicago, Ill.

No Drawing. Application April 22, 1935, Serial No. 17,656

20 Claims. (Cl. 99—117)

This invention relates to the pasteurization of cheeses and more particularly to an improved substance for and method of preparing cheese for pasteurization to impart a suitable degree of smoothness, homogeneity and texture responsive to such treatment, although the teachings of the present invention may be employed to advantage for other purposes in the art of cheese making.

It contemplates more especially the provision of an improved substance for and method of emulsifying cheese so as to render such more smooth in texture, digestible and possessed of better keeping qualities responsive to the pasteurization thereof.

It is worthy of note that green cheese (that is not fully ripened or aged cheese) is more digestible and cheaper than aged cheese, but the latter can be more readily blended and pasteurized without the hazard of disintegration into its component elements of casein and olein at the critical temperature range of pasteurization. Different methods of pasteurizing cheese are employed and one generally adopted method involves grinding of the cheese, heating the ground cheese to a temperature somewhat higher than its melting point, agitating the cheese by mechanical stirrers during the subjection thereof to an elevated temperature within the pasteurizing range, and then pouring the cheese after being converted into a plastic or semi-fluid mass into containers or molds for sealing in preparation for the market as more fully described in the Kraft reissue patent numbered 14,777.

In carrying out the steps of the pasteurizing process such as briefly described supra, however, it is very difficult to maintain the cheese homogeneous. More particularly, heat causes the butter fats or oils usually termed olein to separate from the casein and to float above the surface of the latter. This separation of the cheese constituents is largely eliminated or at least minimized with another method of pasteurization involving constraining, confining and globularizing small increments thereof by subjection to a frictional pressure reaction which results in an elevated pasteurized temperature without resort to extraneous heat as more fully disclosed in the Baumgartner patents numbered 1,802,455 and 1,997,032. As a result, disintegration of the cheese is not so likely in this pasteurizing process according to the statements of the patentee, yet the teachings of the present invention can be utilized advantageously even in this pasteurizing process depending upon the results and taste characteristics sought and the type of cheeses being processed.

To reiterate, in heating cheese to a temperature near its melting point and sufficiently elevated to enable it to be poured into containers after providing a range of temperature effective for pasteurization, the cheese begins to disintegrate in that the olein separates from the casein comprising the principal constituents of cheese. This is especially true in pasteurizing green cheese as distinguished from carefully aged cheese that does not have such a strong tendency to disintegrate even within the critical temperature range. It is worthy of note, however, that aged cheese of appreciable acidity will disintegrate unless properly blended with other types of cheeses of the same genus having high alkalinity and even then the pasteurization thereof must be carefully supervised and performed with the exercise of care when resorted to the above referred to stirring process of pasteurization. This is especially true in the absence of the so-called chemical emulsifier of the character described in the Carpenter patent numbered 1,389,577; nevertheless, cheese is rendered valueless for human consumption after disintegration or separation between the olein and casein occurs.

The younger or more green the cheese, the greater is the acidity thereof. Cheese acidity encourages insolubility of the casein while alkalinity encourages or provides casein solubility. In other words, an acid will not render casein soluble but alkalies are generally useful for rendering casein soluble. Our observations lead us to believe that a certain amount of soluble casein must be present in cheese to preclude disintegration. In consequence thereof, to preclude the disintegration of cheese that is predominantly green rather than aged and/or to affect the butter fats and casein during their disintegration, to reunite into a homogeneous mass of the desired smoothness while being pasteurized by one method or another so as to result in an emulsified mass, we have found that the use of a soluble casein or rendering the casein in cheese soluble is productive of the desired emulsified effect resulting from pasteurization. Casein is preferably rendered soluble by using an amide compound such as urea or a suitable urea compound such as urea-sodium-caseinate or other alkaline caseinates as ammonium or potassium. Such a compound is preferably used with a lactic casein rather than a rennet casein, for the combined addition to the cheese to be processed, thereby combining these with the casein already present in the cheese to render such soluble preparatory to or simultaneous with the pasteurization thereof so that the olein will combine therewith to form an emulsion during the processing. Urea not only is an important aid to that end, but also imparts increased digestibility as well as more nutrition thereto.

It has been found that a small quantity of urea which is a neutral compound is very desirable for rendering soluble the casein in cheese. Cheese apparently contains something similar to urease or other enzymes which decompose the urea and thus preclude its desirable functions under certain conditions of cheese storage in a room at higher than normal temperatures. For that reason, it is best to use urea in conjunction with a quantity of lactic casein for combined introduction into the cheese as will appear more fully hereinafter. More specifically, in processing American cheese, by way of illustration, two pounds of lactic casein preferably having a 7 pH are combined with three to five ounces of urea. This is then added to about two pounds of water to form a thick paste. One to five per cent (by weight) of this paste together with additional water sufficient for the proper moisture content regulation, is added to the cheese after the grinding thereof and preliminary to pasteurization.

Urea is a carbamide having the chemical formula $CO(NH_2)_2$ and may be substituted by urea-sodium-caseinate which is a mixture of urea and sodium caseinate or other alkali caseinates, such as ammonium or potassium caseinate, which is combined in association with lactic casein with cheese in the manner set forth supra for the purpose of maintaining the homogeneity thereof and precluding disintegration as set forth in connection with urea. Swiss, American, brick cheese and other cheeses especially of the Cheddar genus, in their green or partially aged state, are effectively treated with a suitable amide compound such as urea, urea citrate, urea-sodium chloride, mono-methyl urea, urea-sodium-caseinate or other suitable ammonium, sodium and potassium alkaline compounds thereof. From one to five per cent by weight of the aforesaid amide compounds such as urea or the other suitable compounds, is preferably mixed with lactic casein for incorporation in cheese after the grinding thereof and preliminary to pasteurization as previously set forth.

In providing the urea-sodium-caseinate, for instance, it is preferred to use a mixture of one-half to three parts of sodium caseinate, one to three parts of urea and approximately four parts of water which are mixed and boiled preparatory to combining with cheese. A one to five per cent (by weight) of this boiled solution added to cheese immediately prior to the pasteurization thereof by any known process, has given very satisfactory results. Then, too, powdered urea and/or sodium caseinate can be mixed with water in the above specified proportions. The water may be of room temperature and the mixture thereof with urea and/or sodium caseinate allowed to stand from 24 to 48 hours at ordinary temperatures before using. The proportions may vary depending upon the particular process of pasteurizing and the type, age and blend of the cheeses, but the above proportions serve to exemplify a satisfactory combination for the intended purpose.

There is a possibility that urea and/or urea-sodium-caseinate and the other amide compounds chemically combine with cheese because it forms compounds with acids, bases and salts, both organic and inorganic. It is definitely known that urea and/or urea-sodium caseinate have a solubilizing action on the casein in the cheese. The dissolved casein doubtless acts as an emulsifying agent, especially when treated in a manner prescribed in the above specified Baumgartner patent or when actively stirred in the manner prescribed in the aforesaid Kraft patents. This chemical and pasteurizing treatment imparts a more flexible and natural body to cheese in that air holes form and a more spongy texture results. In other words, the casein which has been made soluble by the action of the urea and/or the other suitable compounds, acts as an emulsifier between the oil and water phases of the constituents in the cheese, prevents oiling off even though the temperature range is unfavorable for maintaining the cheese constituents in a homogeneous state, and imparts a more smooth texture having good slicing qualities and better taste characteristics than heretofore attained.

It should be noted that ammonium carbonate and urea are similar molecularly but differ in their molecular weights and structural formulae. They are similar in that both contain carbon, oxygen, hydrogen and nitrogen, and that the hydrogen is combined with the nitrogen. Actually they differ so from a chemical standpoint that there is no equivalency from a chemical standpoint. Urea and/or urea-sodium caseinate and/or the other specified compounds do not serve as preservatives, and have been advocated for internal use as a medicine by prescription. Urea is an amide possessing the chemical characteristics of a base, but does not happen to be any more active as a base than as an acid. It is very similar in its molecular weight to ammonium carbonate, but distinctly different therefrom in its structural formula. Urea itself is considered assimilatable by the human body and has been recommended for internal use. It is definitely an organic compound that can be burned up by the body and has nutrition value. It not only increases the nutritive value of cheese as a food, but also improves the flavor of cheese beyond that attributable to well known chemicals that have heretofore been proposed for use in combination with cheese.

Various changes may be made in the embodiment of the invention herein specifically described without departing from or sacrificing any of the advantages of the invention as defined in the appended claims.

We claim:

1. A method of plasticizing Cheddar cheese and the like which consists in comminuting cheese, adding a quantity of urea to said comminuted cheese, and pasteurizing the combined cheese and urea to avoid detrimental separation between the cheese constituents.

2. A method of plasticizing Cheddar cheese and the like which consists in comminuting cheese, adding a mixture of urea and lactic casein to said comminuted cheese, and pasteurizing the combined cheese and urea compound to avoid detrimental separation between the cheese constituents.

3. A method of plasticizing Cheddar cheese and the like which consists in comminuting cheese, adding a mixture of urea, lactic casein and water to said comminuted cheese, and pasteurizing the combined cheese and said urea-lactic-casein water mixture to avoid detrimental separation between the cheese constituents.

4. A method of plasticizing Cheddar cheese and the like which consists in comminuting cheese, adding an edible urea compound in the amount ranging from 1 to 5 per cent to said comminuted cheese, and pasteurizing the combined cheese and urea compound to avoid detrimental separation between the cheese constituents.

5. A method of plasticizing Cheddar cheese and the like which consists in comminuting cheese, adding a quantity in the amount ranging from 1 to 5 per cent of urea with lactic casein to said comminuted cheese, and pasteurizing the combined cheese and urea-lactic-casein mixture to avoid detrimental separation between the cheese constituents.

6. A product of manufacture comprising pasteurized cheese plasticized with urea.

7. A product of manufacture comprising a pasteurized mixture of cheese plasticized with an edible urea compound and lactic casein.

8. A product of manufacture comprising a pasteurized cheese plasticized with an edible urea compound intermixed with lactic casein.

9. A product of manufacture comprising pasteurized cheese plasticized with an edible urea compound.

10. A product of manufacture comprising cheese of the Cheddar genus plasticized with an edible urea compound.

11. A product of manufacture comprising pasteurized cheese of the Cheddar genus plasticized with an edible urea compound, lactic casein, and water intermixed therewith.

12. A product of manufacture comprising cheese plasticized with an edible urea compound in an amount ranging from 1 to 5 per cent.

13. A product of manufacture comprising pasteurized cheese plasticized with an edible urea compound and lactic casein mixture in an amount ranging from 1 to 5 per cent.

14. A product of manufacture comprising pasteurized cheese of the Cheddar genus plasticized with an edible urea compound and a lactic casein mixture in an amount ranging from 1 to 5 per cent.

15. A method of plasticizing Cheddar cheese and the like which consists in comminuting cheese, adding an edible alkaline caseinate compound with lactic casein to said comminuted cheese, and pasteurizing the combined cheese and urea compound to avoid detrimental separation between the cheese constituents.

16. A product of manufacture comprising Cheddar cheese plasticized with a suitable alkaline caseinate and an edible urea compound.

17. A method of plasticizing Cheddar cheese and the like which consists in comminuting cheese, adding a quantity in the amount ranging from 1 to 5 per cent of an alkaline caseinate and an edible urea compound to said comminuted cheese, and pasteurizing the combined cheese and urea to avoid detrimental separation between the cheese constituents.

18. A method of plasticizing Cheddar cheese and the like which consists in comminuting cheese, adding equal portions of urea and sodium caseinate to said comminuted cheese, and pasteurizing the combined cheese and said urea-sodium-caseinate compound to avoid detrimental separation between the cheese constituents.

19. A product of manufacture comprising Cheddar cheese plasticized with an edible urea-sodium-caseinate compound in an amount ranging from 1 to 5 per cent.

20. A product of manufacture comprising pasteurized cheese of the Cheddar genus plasticized with an edible urea-sodium-caseinate compound and a lactic casein in combination therewith.

GEORGE LINCOLN TELLER.
W. KEDZIE TELLER.